United States Patent
Park

(10) Patent No.: US 8,000,383 B2
(45) Date of Patent: Aug. 16, 2011

(54) DATA REPRODUCTION APPARATUS AND METHOD CAPABLE OF DETERMINING LEVEL VALUE OF VITERBI DECODER, AND COMPUTER-READABLE RECORDING MEDIUM HAVING RECORDED THEREON PROGRAM FOR IMPLEMENTING THE DATA REPRODUCTION METHOD

(75) Inventor: Hyun-soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 11/965,023

(22) Filed: Dec. 27, 2007

(65) Prior Publication Data

US 2008/0225994 A1     Sep. 18, 2008

(30) Foreign Application Priority Data

Mar. 12, 2007  (KR) ........................ 10-2007-0024207

(51) Int. Cl.
 *H03H 7/30*  (2006.01)
 *H04L 27/06*  (2006.01)
(52) U.S. Cl. ........................ 375/229; 375/341
(58) Field of Classification Search ............ 375/29, 375/341, 348, 229; 369/44.32, 44.35, 47.19, 369/59.22
See application file for complete search history.

(56) References Cited

U.S. PATENT DOCUMENTS

| 6,222,808 | B1 | 4/2001 | Kagawa | |
|---|---|---|---|---|
| 7,480,224 | B2 * | 1/2009 | Wu et al. | 369/59.22 |
| 7,616,547 | B2 * | 11/2009 | Lee et al. | 369/59.21 |
| 2004/0109399 | A1 | 6/2004 | Kaneshige | |
| 2005/0270937 | A1 * | 12/2005 | Lee et al. | 369/47.19 |

FOREIGN PATENT DOCUMENTS

| JP | 9-306109 | 11/1997 |
|---|---|---|
| KR | 2004-110090 | 12/2004 |

OTHER PUBLICATIONS

International Search Report issued on Apr. 16, 2008 in PCT International Application No. PCT/KR2008/000016.

* cited by examiner

*Primary Examiner* — Khai Tran
(74) *Attorney, Agent, or Firm* — NSIP Law, PC

(57) ABSTRACT

A data reproduction apparatus and method to accurately determine an initial level value of a viterbi decoder regardless of whether an operating frequency is in a stable state, and a recording medium having recorded thereon a program for implementing the data reproduction method, the data reproduction apparatus including: a storage unit to store a first input signal; a frequency detection unit to generate a frequency detection signal indicating that a frequency of the first input signal is detected and frequency information of the first input signal based on a second input signal; and a level value determination unit to detect at least one level value for the first input signal by converting a sampling rate for the first input signal based on a ratio between the frequency information and preset frequency information, and to determine the detected level value as an initial level value of the viterbi decoder.

34 Claims, 10 Drawing Sheets

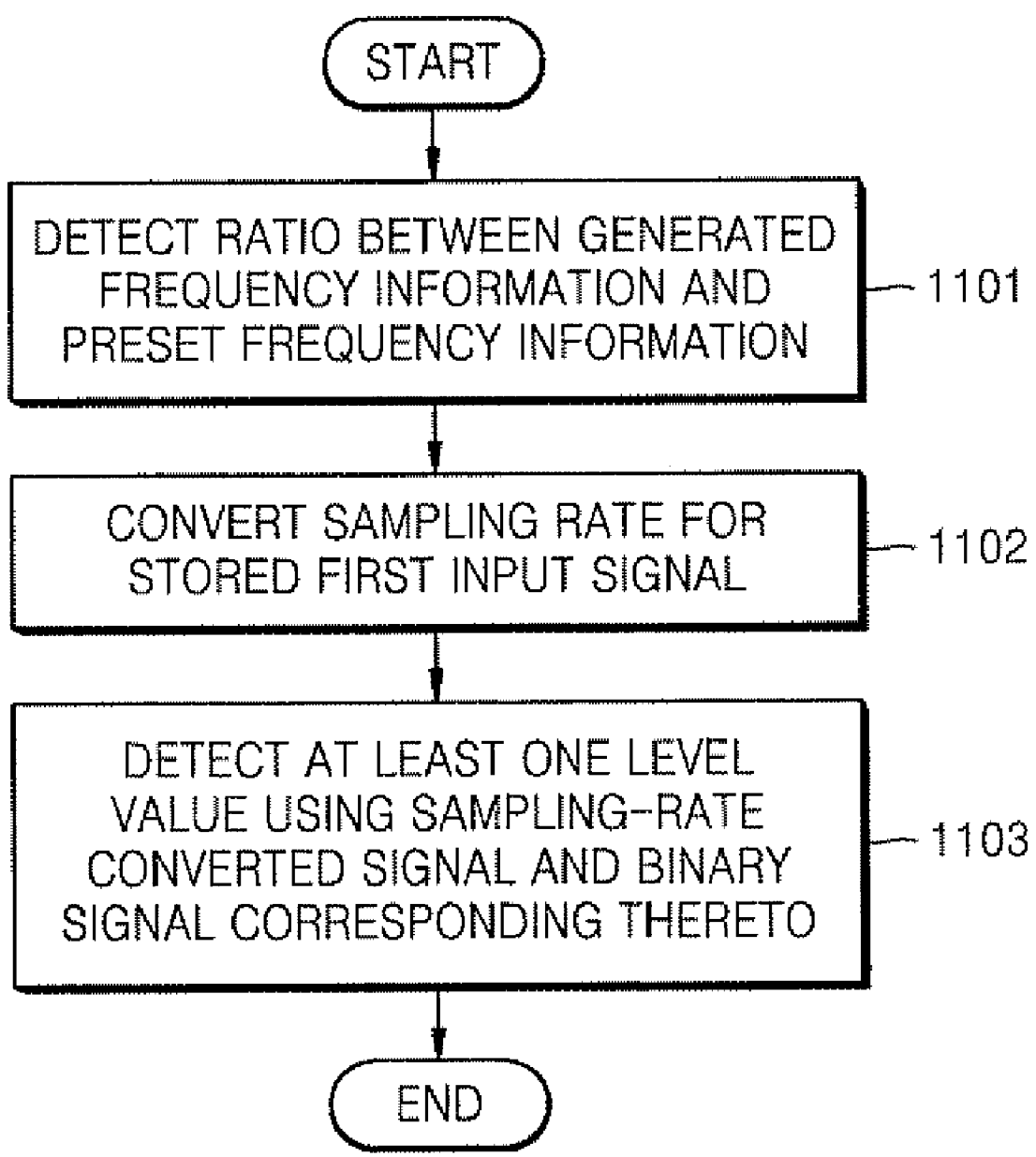

DATA REPRODUCTION APPARATUS AND METHOD CAPABLE OF DETERMINING LEVEL VALUE OF VITERBI DECODER, AND COMPUTER-READABLE RECORDING MEDIUM HAVING RECORDED THEREON PROGRAM FOR IMPLEMENTING THE DATA REPRODUCTION METHOD

CROSS-REFERENCE TO RELATED APPLICATIONS

This application claims the benefit of Korean Application No. 2007-24207, filed on Mar. 12, 2007 in the Korean Intellectual Property Office, the disclosure of which is incorporated herein by reference.

BACKGROUND OF THE INVENTION

1. Field of the Invention

The following description relates to data reproduction using a viterbi decoder, and more particularly, to a data reproduction apparatus and method capable of accurately determining a level value of a viterbi decoder, and a computer-readable recording medium having recorded thereon a program to implement the data reproduction method.

2. Description of the Related Art

An apparatus for reproducing data from a recording medium (such as a disc) performs a binarization process to convert a radio frequency (RF) signal read from the disc into a binary signal. During the binarization process, a conventional data reproduction apparatus uses a viterbi decoder in order to obtain the binary signal with minimal errors.

However, for an optimal operation of the viterbi decoder, an initial level value of the viterbi decoder must be appropriately set for a channel characteristic and a phase-locked loop (PLL) clock in the data reproduction apparatus must operate normally. The normal operation of the PLL clock indicates that the operating frequency of the data reproduction apparatus is in a stable state.

If the initial level value of the viterbi decoder is not appropriate for the channel characteristic or the PLL clock does not operate normally, a binary signal is output from the viterbi decoder with an error. Accordingly, an erroneous reproduction signal is output from the data reproduction apparatus. A data reproduction apparatus that reproduces data from a high-density disc is particularly susceptible to such an error occurring.

Thus, if the PLL clock operates normally, the conventional data reproduction apparatus determines the initial level value of the viterbi decoder appropriate for the channel characteristic and binarizes an input signal while updating the level value of the viterbi decoder for the input signal. Thus, unless the PLL clock operates normally, the conventional data reproduction apparatus cannot determine the initial level value of the viterbi decoder.

Conventionally, when the PLL clock does not operate normally, the data reproduction apparatus binarizes an input signal using a preset initial level value of the viterbi decoder. However, if the preset initial level value of the viterbi decoder is not suitable for a channel characteristic, a binary signal is output from the viterbi decoder with an error. As a result, an erroneous reproduction signal from the data reproduction apparatus is output.

SUMMARY OF THE INVENTION

General aspects provide a data reproduction apparatus and method capable of accurately determining an initial level value of a viterbi decoder regardless of whether an operating frequency of the data reproduction apparatus is stabilized.

General aspects also provide a data reproduction apparatus and method capable of accurately determining an initial level value of a viterbi decoder even when the operating frequency of the data reproduction apparatus is not stabilized.

General aspects also provide a computer-readable recording medium having recorded thereon a program to implement the data reproduction method.

In one general aspect, there is provided a data reproduction apparatus having a viterbi decoder, the reproduction apparatus including: a storage unit to store a first input signal; a frequency detection unit to generate a frequency detection signal indicating that a frequency of the first input signal is detected, and to generate frequency information of the first input signal based on a second input signal; and a level value determination unit to detect at least one level value for the first input signal according to the frequency detection signal by converting a sampling rate for the first input signal based on a ratio between the detected frequency information and preset frequency information, and to determine the at least one detected level value as an initial level value of the viterbi decoder.

When the first input signal and the second input signal are a same signal, the frequency detection unit may include: a sync signal detection unit to detect a sync signal from the second input signal; a frequency detection signal generation unit to generate the frequency detection signal if the sync signal is detected by the sync signal detection unit; and a frequency information generation unit to generate a ratio between the period of the sync signal detected by the sync signal detection unit and a preset reference period as the frequency information.

When the first input signal is a signal reproduced from a disc and the second input signal is a wobble signal reproduced from the disc, the frequency detection unit may include: a frequency detection signal generation unit to generate the frequency detection signal based on a period of the wobble signal; and a frequency information generation unit to generate a count value of system clocks generated by the data reproduction apparatus during the period of the wobble signal as the frequency information.

The level value determination unit may include: a sampling rate conversion unit to convert the sampling rate for the first input signal stored in the storage unit based on the ratio between the detected frequency information and preset frequency information; a binary signal generation unit to generate a binary signal corresponding to the signal for which the sampling rate is converted by the sampling rate conversion unit; and a level value detection to detect the at least one level value using the sampling-rate converted signal and the binary signal.

In another aspect, there is provided a data reproduction method using a viterbi decoder, the data reproduction method including: storing a first input signal; generating a frequency detection signal indicating that a frequency of the first input signal is detected and frequency information of the first input signal based on a second input signal; detecting a ratio between the detected frequency information and preset frequency information; detecting at least one level value for the first input signal by converting a sampling rate for the first input signal based on the ratio; and determining the at least one detected level value as an initial level value of the viterbi decoder.

In another aspect, there is provided a computer-readable recording medium having recorded thereon a program for implementing a data reproduction method using a viterbi decoder; the data reproduction method including: storing a first input signal; generating a frequency detection signal indicating that a frequency of the first input signal is detected and frequency information of the first input signal based on a second input signal; detecting a ratio between the detected frequency information and preset frequency information; detecting at least one level value for the first input signal by converting a sampling rate for the first input signal based on the ratio; and determining the at least one detected level value as an initial level value of the viterbi decoder.

In another aspect, there is provided a data reproduction apparatus having a viterbi decoder, the data reproduction apparatus including: a frequency detection unit to generate frequency information of a first input signal based on a second input signal; and a level value determination unit to detect at least one level value for the first input signal by converting a sampling rate for the first input signal based on a ratio between the generated frequency information and preset frequency information, and to determine the at least one detected level value as an initial level value of the viterbi decoder.

In another aspect, there is provided a data reproduction method using a viterbi decoder, the data reproduction method including: generating frequency information of a first input signal based on a second input signal; detecting a ratio between the generated frequency information and preset frequency information; detecting at least one level value for the first input signal by converting a sampling rate for the first input signal based on the detected ratio; and determining the at least one detected level value as an initial level value of the viterbi decoder.

Additional aspects and/or features may be apparent from the following detailed description, the drawings, and the claims which follow.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 11 is a detailed flowchart illustrating an example of a method of detecting at least one level value for a first input signal illustrated in FIG. 8.

DETAILED DESCRIPTION OF THE EMBODIMENTS

Figure 1:
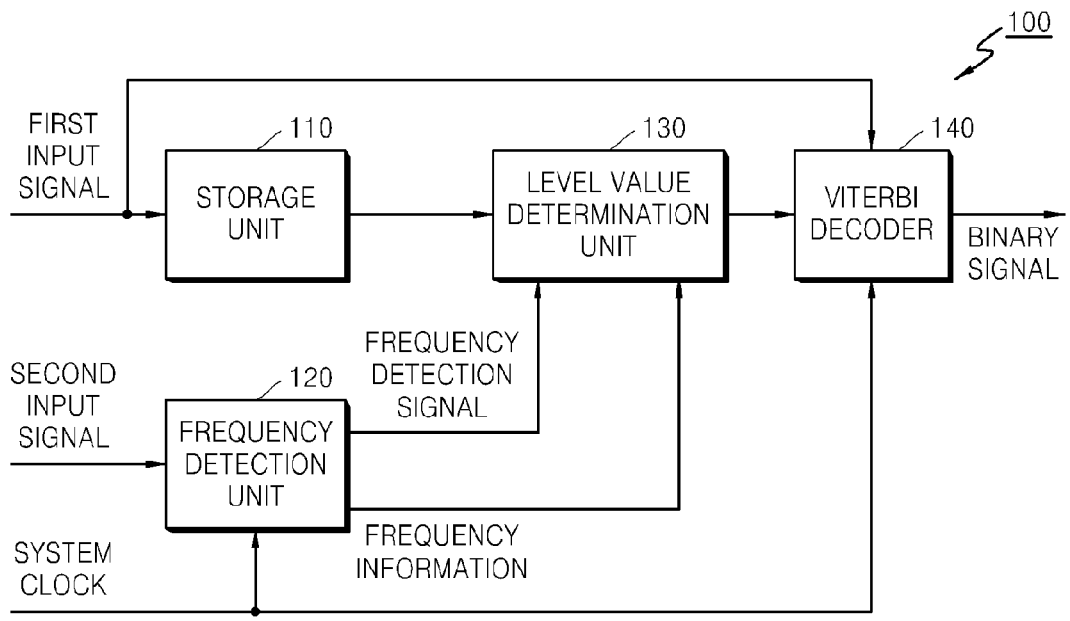
FIG. 1 is a block diagram illustrating an example of a data reproduction apparatus.

Reference will now be made in detail to examples of general aspects that are illustrated in the accompanying drawings, wherein like reference numerals refer to the like elements throughout. Examples are described below in order to explain general aspects by referring to the figures.

FIG. 1 is a block diagram illustrating an example of a data reproduction apparatus 100. Referring to FIG. 1, the data reproduction apparatus 100 includes a storage unit 110, a frequency detection unit 120, a level value determination unit 130, and a viterbi decoder 140.

The storage unit 110 stores a first input signal, which is sampled digital data or a quantized binarized signal of a reproduced signal. Thus, the first input signal may have a numerical value between 0 and 255. Furthermore, a component to convert the reproduced signal into the sampled digital data or the quantized binary signal may be provided in front of the storage unit 110.

Upon input of a second input signal, the frequency detection unit 120 detects a frequency of the first input signal and then generates a frequency detection signal and frequency information of the first input signal. The frequency detection signal indicates that the frequency of the first input signal is detected.

Figure 2:
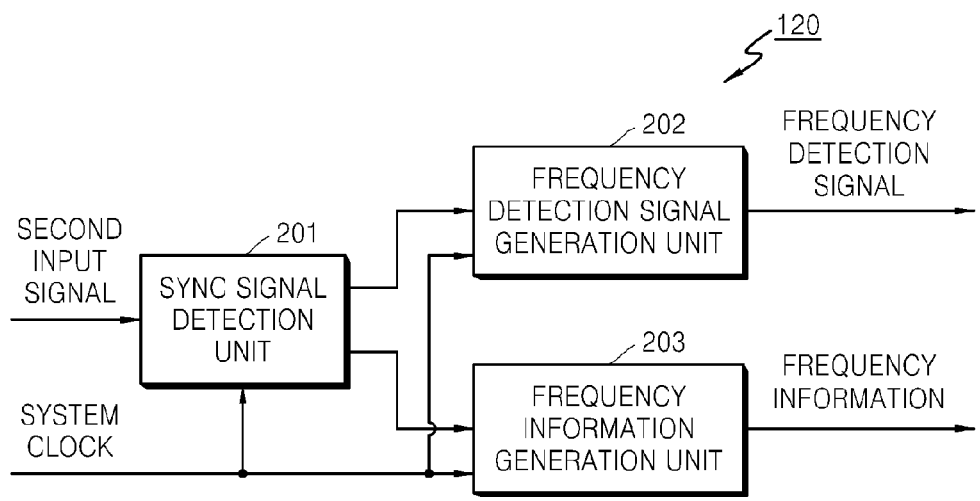
FIG. 2 is a detailed block diagram illustrating an example of a frequency detection unit illustrated in FIG. 1.

Specifically, if the first input signal and the second input signal are a same signal, the frequency detection unit 120 can generate the frequency detection signal and the frequency information based on a sync signal (or a sync pattern) of the first input signal. Moreover, when the first input signal and the second input signal are the same signal, the frequency detection unit 120 can be configured as illustrated in FIG. 2. Referring to FIG. 2, the frequency detection unit 120 includes a sync signal detection unit 201, a frequency detection signal generation unit 202, and a frequency information generation unit 203.

The sync signal detection unit 201 detects a sync signal from the second input signal. The detection of the sync signal from the second input signal can be performed by detecting an interval having a maximum period (or a longest period) from the second input signal. The detection of the interval having the maximum period may be performed by detecting an interval having a maximum (or a longest) distance between two points that are sampled based on a zero crossing point. Upon detection of the sync signal, the sync signal detection unit 201 transmits a sync signal detection signal indicating that the sync signal is detected to the frequency detection signal generation unit 202 and the frequency information generation unit 203. The sync signal detection unit 201 may transmit the sync signal detection signal while transmitting information about the detected maximum period to the frequency information generation unit 203.

The sync signal detection unit 201 may be defined as a maximum period detector. In this case, the maximum period detector detects a maximum-period signal from the second input signal, and then transmits a signal indicating that the maximum-period signal is detected to the frequency detection signal generation unit 202 and the frequency information generation unit 203. The maximum period detector may transmit the signal while transmitting information about the detected maximum period to the frequency information generation unit 203.

Thus, when the first input signal and the second input signal are the same signal, the frequency detection unit 120 can detect the current operating frequency by detecting the maximum-period signal from the second input signal. Such an operation is based on the fact that the maximum-period signal is generated at predetermined intervals.

Upon receipt of the sync signal detection signal from the sync signal detection unit 201, the frequency detection signal generation unit 202 generates the frequency detection signal. In other words, if the frequency detection signal generation unit 202 outputs, for example, 1 for an interval during which the sync signal detection signal is in an active state, the frequency detection signal generation unit 202 outputs 0 for the other intervals.

Upon receipt of the sync signal detection signal and the information about the detected maximum period from the sync signal detection unit 201, the frequency information generation unit 203 calculates a ratio between the received information about the maximum period and information on a preset reference period (or a sync period). Then, the frequency information generation unit 203 generates the calculated ratio as the frequency information. For example, if the received information about the detected maximum period is 10 and the information about the preset reference period is 14, the frequency information generation unit 203 generates 10/14 as the frequency information.

Figure 3:
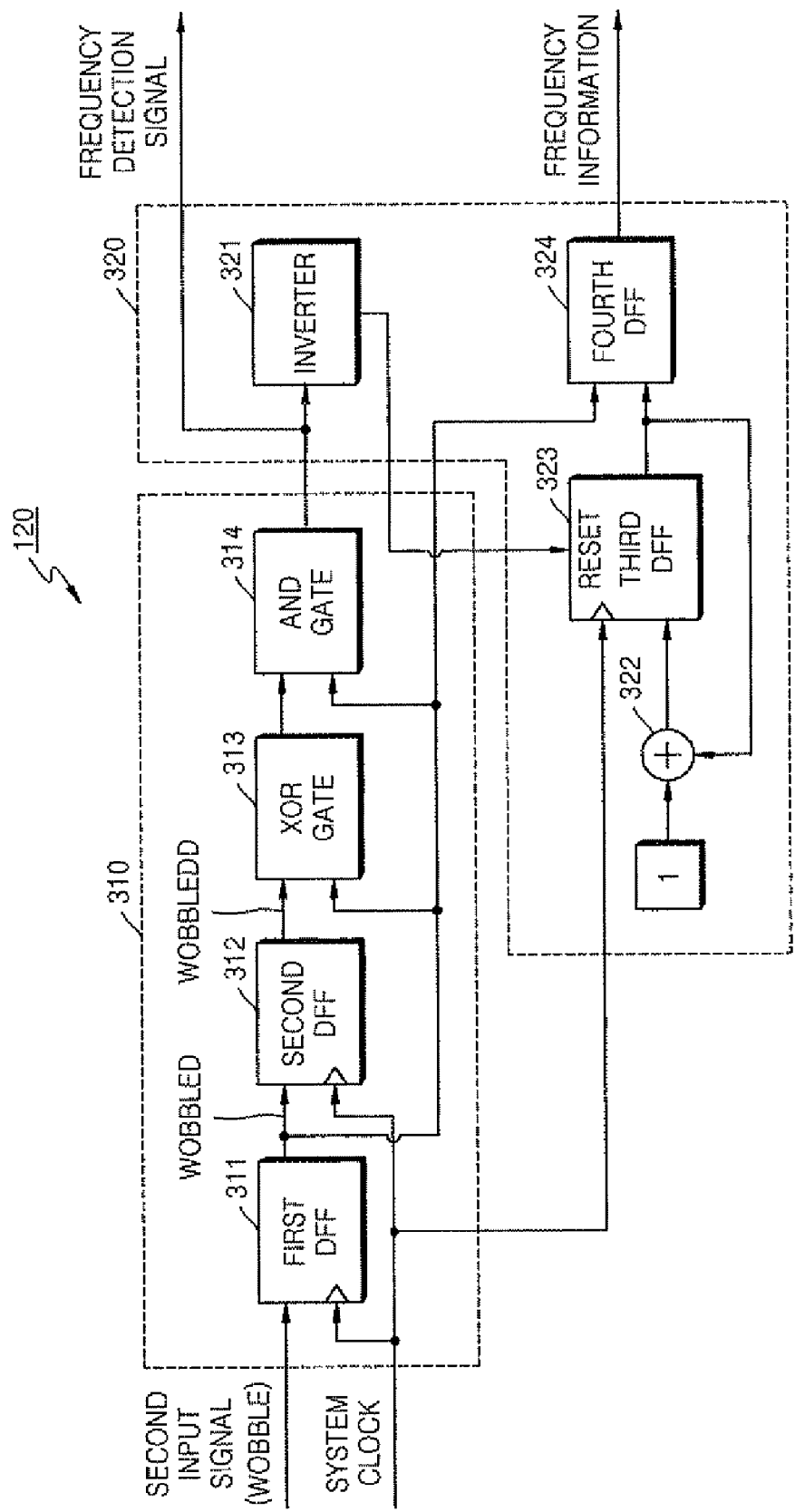
FIG. 3 is a detailed block diagram illustrating another example of a frequency detection unit illustrated in FIG. 1.

When the first input signal is sampled digital data or a quantized binary signal of a radio frequency (RF) signal reproduced from a disc and the second input signal is a wobble signal reproduced from the disc, the frequency detection unit 120 illustrated in FIG. 1 may be configured as illustrated in FIG. 3. Referring to FIG. 3, the frequency detection unit 120 includes a frequency detection signal generation unit 310 and a frequency information generation unit 320.

The frequency detection signal generation unit 310 generates the frequency detection signal based on a period of the wobble signal. To this end, the frequency detection signal generation unit 310 includes a first D flip-flop (DFF) 311, a second DFF 312, an exclusive-OR (XOR) gate 313, and an AND gate 314 as illustrated in FIG. 3. The frequency information generation unit 320 generates a count value of system clocks generated from the data reproduction apparatus 100 during the period of the wobble signal as the frequency information. To this end, the frequency detection signal generation unit 320 includes an inverter 321, an adder 322, a third DFF 323, and a fourth DFF 324.

The operations of the frequency detection signal generation unit 310 and the frequency information generation unit 320 will be described in more detail with reference to the timing diagram illustrated in FIGS. 4A through 4H. FIGS. 4A through 4H are operation timing diagrams for the frequency detection signal generation unit 310 and the frequency information generation unit 320.

Upon input of the wobble signal having a period as illustrated in FIG. 4B, the first DFF 311 outputs a delayed wobble signal WOBBLED. The first DFF 311 delays the wobble signal by one system clock cycle, as illustrated in FIG. 4C, in synchronization with a system clock that is input according to a clock cycle as illustrated in FIG. 4A. As can be seen from FIGS. 4A and 4B, the system clock oscillates at a higher frequency than the frequency of the wobble signal. In an ideal case, the system clock oscillates at a frequency that is an integral multiple of the frequency of the wobble signal. For example, in the case of digital versatile disc-random access memory/recordable/rewritable (DVD-RAM/R/RW), 186 system clocks oscillate with respect to a single wobble signal.

The second DFF 312 receives the delayed wobble signal WOBBLED and outputs a delayed wobble signal WOBBLEDD. The second DFF 312 delays the delayed wobble signal WOBBLED by one system clock cycle, as illustrated in FIG. 4D, in synchronization with the system clock illustrated in FIG. 4A. The XOR gate 313 performs an XOR operation on the delayed wobble signal WOBBLED output from the first DFF 311 and the delayed wobble signal WOBBLEDD output from the second OFF 312, thereby outputting a signal having a period as illustrated in FIG. 4E. The AND gate 314 performs an AND operation on the signal output from the XOR gate 313 and the delayed wobble signal WOBBLED output from the first DFF 311. Accordingly, the AND gate 314 outputs the frequency detection signal having a period as illustrated in FIG. 4F.

As illustrated in FIG. 4G, the inverter 321 outputs a signal that is an inversion of the frequency detection signal having the period as illustrated in FIG. 4F. When the frequency detection signal is generated, the third DFF 323 is reset to 0, stores data output from the adder 322 in synchronization with the system clock illustrated in FIG. 4A, and stores data output from the adder 322 while transmitting the stored data to the fourth DFF 324 in synchronization with the next system clock. After the third DFF 323 is reset by the signal output from the inverter 321, the third DFF 323 temporarily stores data having added 1 thereto each time by the adder 322, as illustrated in FIG. 4H. Each time the delayed wobble signal WOBBLED is input from the first DFF 311, the fourth DFF 324 stores data transmitted from the third DFF 323 and outputs the stored data as the frequency information. Thus, when the third DFF 323 operates as illustrated in FIG. 4H, the fourth DFF 324 outputs 17 as the frequency information.

The frequency detection signal generation unit 310 illustrated in FIG. 3 may be defined as a component to generate a reset signal according to the period of an input wobble signal by further including the inverter 321 of the frequency information generation unit 320. In other words, the wobble signal WOBBLED delayed from the input wobble signal by one system clock cycle and the wobble signal WOBBLEDD delayed from the input wobble signal by two system clock cycles are generated. Then, the XOR operation, the AND operation, and inversion are performed on the delayed wobble signals, thereby generating the reset signal.

The frequency information generation unit 320 that does not include the inverter 321 may be defined as a counter circuit. In other words, upon the generation of the reset signal, a count value of a counter circuit (the adder 322 and the third DFF 323) that increases 1 for each system clock is set to 0, a count value before being set to 0 is latched (by the fourth DFF 324), and the latched count value is generated as the frequency information each time the wobble signal is input.

Figure 4:
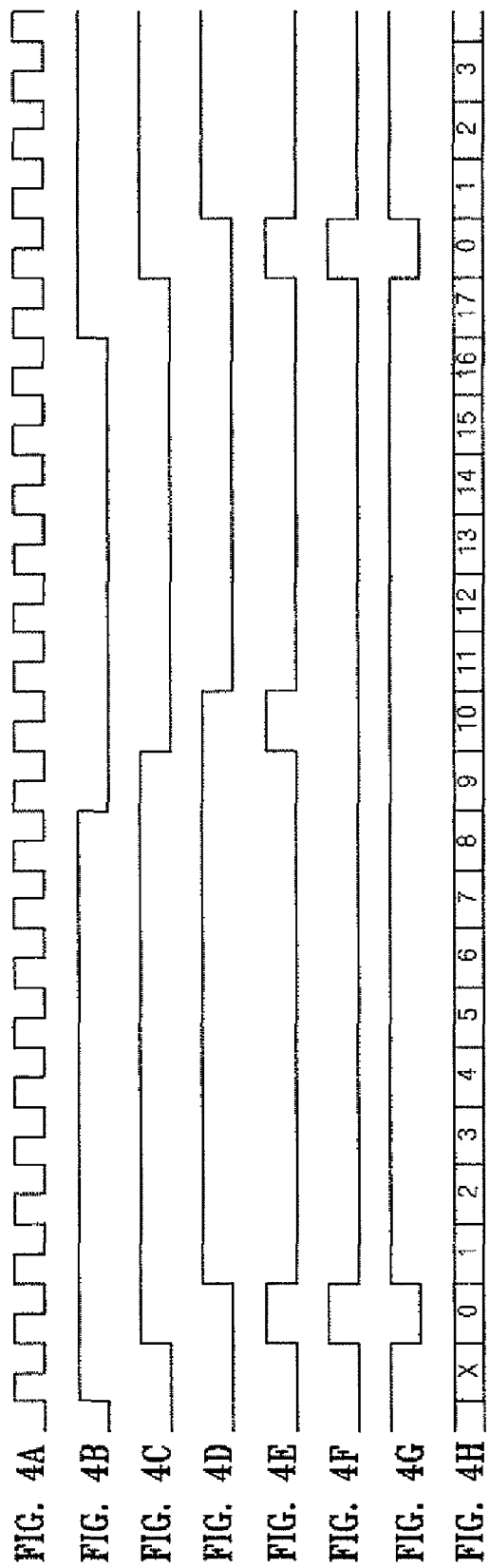
FIGS. 4A through 4H are operation timing diagrams for function blocks illustrated in FIG. 3.

Upon generation of the frequency detection signal from the frequency detection unit 120, the level value determination unit 130 (illustrated in FIG. 1) detects a ratio between the frequency information transmitted from the frequency detection unit 120 and preset frequency information. The preset frequency information is information about the stable operating frequency of the data reproduction apparatus 100. For example, if the preset frequency information is 14 and the frequency information transmitted from the frequency detection unit 120 is 17 (as illustrated in FIG. 4), the detected ratio indicates that the operating frequency of the first input signal is high. On the other hand, if the preset frequency information is 14 and the frequency information transmitted from the frequency detection unit 120 is 10, the detected ratio indicates that the operating frequency of the first input signal is low.

Upon the detection of the ratio between the transmitted frequency information and the preset frequency information, the level value determination unit 130 converts a sampling rate for the first input signal stored in the storage unit 110 based on the detected ratio. Specifically, in order to convert the sampling rate for the first input signal stored in the storage unit 110, the level value determination unit 130 reads and performs interpolation on the first input signal stored in the storage unit 110. The interpolation may, for example, be linear interpolation, Fallow's interpolation, or interpolation that is similar thereto. In this way, a signal for which the sampling rate is converted from that of the first input signal stored in the storage unit 110 is obtained.

Next, the level value determination unit 130 detects a plurality of level values for the first input signal using the sampling-rate converted signal and a binary signal corresponding thereto. The level value determination unit 130 determines the plurality of detected level values as an initial level value of the viterbi decoder 140. Specifically, the level value determination unit transmits the plurality of detected level values as the initial level value of the viterbi decoder 140.

Figure 5:
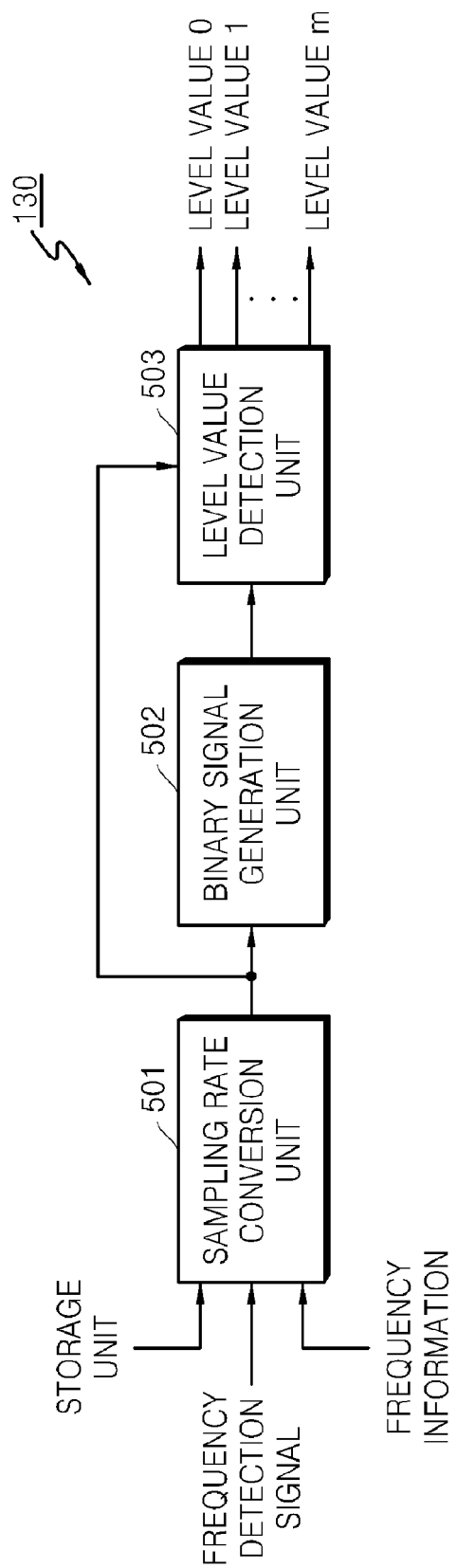
FIG. 5 is a detailed block diagram illustrating an example of a level value determination unit illustrated in FIG. 1.

The level value determination unit 130 illustrated in FIG. 1 can be configured as illustrated in FIG. 5. Referring to FIG. 5, the level value determination unit 130 includes a sampling rate conversion unit 501, a binary signal generation unit 502, and a level value detection unit 503.

Upon input of the frequency detection signal from the frequency detection unit 120 (illustrated in FIG. 1), the sampling rate conversion unit 501 detects (or calculates) the ratio between the transmitted frequency information and the preset frequency information. The sampling rate conversion unit 501 may operate in such a way that a sampling clock of the sampling rate conversion unit 501 is faster than or equal to a signal per unit clock according to the operating frequency of the data reproduction apparatus 100 (or a normal operation clock). The sampling rate conversion unit 501 may operate in such a way because information between sampling clocks may not be reconstructed if the sampling clock is slower than the normal operation clock. For example, when a sine wave is input at 10 Hz and an operation clock is 50 Hz, the shape of the sine wave can be completely reconstructed by sampling the sine wave at 50 Hz. However, when sampling for the sine wave is performed at 5 Hz, information of the original signal may be lost because only constant data is sampled repeatedly.

The preset frequency information is an operating frequency at which the data reproduction apparatus 100 operates normally. Upon detection (or calculation) of the ratio between the transmitted frequency information and the preset frequency information, the sampling rate conversion unit 501 determines a sampling rate for the first input signal stored in the storage unit 110 based on the detected ratio. Then, the sampling rate conversion unit 501 performs interpolation on the signal read from the storage unit 110 based on the determined sampling rate, thereby obtaining a signal for which the sampling rate is converted from that of the first input signal stored in the storage unit 110. Thus, the signal output from the sampling rate conversion unit 501 is a signal that is appropriately rearranged for the operating frequency of the data reproduction apparatus 100.

The binary signal generation unit 502 generates a binary signal corresponding to the sampling-rate converted signal output from the sampling rate conversion unit 501. Specifically, when the frequency detection unit 120 generates the frequency information using the sync pattern, the binary signal generation unit 502 may generate a binary signal of the sync signal as the binary signal. The binary signal generation unit 502 may also generate a preset binary signal. For example, when data recorded at a specific position of a disc is known, the binary signal generation unit 502 may generate the binary signal based on the data recorded at the specific position. However, when data recorded on a disc is not known, since a sync signal detected from data that is read from the disc itself is a binary signal, the binary signal generation unit 502 may generate a window signal based on the sync signal and generate a signal included in the window signal as the binary signal.

The level value detection unit 503 detects at least one level value for the first input signal using the sampling-rate converted signal output from the sampling rate conversion unit 501 and the binary signal transmitted from the binary signal generation unit 502. The at least one level value is provided as the initial level value of the viterbi decoder 140. That is, the at least one detected level value is determined as the initial level value of the viterbi decoder 140.

Figure 6:
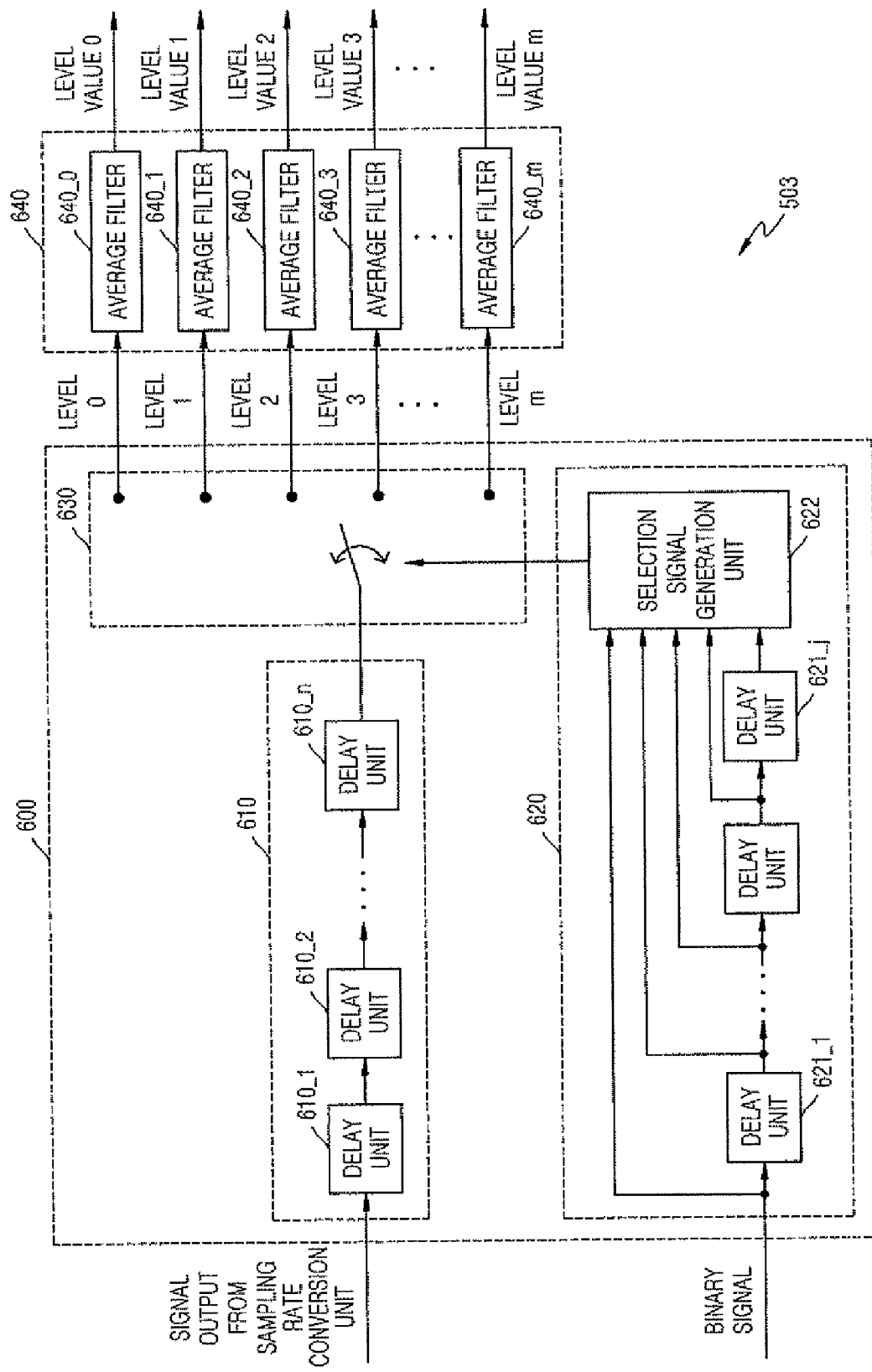
FIG. 6 is a detailed block diagram illustrating an example of a level value detection unit illustrated in FIG. 5.

The level value detection unit 503 may be configured as illustrated in FIG. 6. Referring to FIG. 6, the level value detection unit 503 includes an input signal separation unit 600 and a level value detection block 640.

The input signal separation unit 600 separates an input signal (i.e., a signal output from the sampling rate conversion unit 501) into a plurality of levels using the binary signal (i.e., a signal output from the binary signal generation unit 502). To this end, the input signal separation unit 600 includes an input signal processing unit 610, a binary signal processing unit 620, and a selection unit 630.

The input signal processing unit 610 includes n number of delay units 610_1 to 610_n. The n number of delay units 610_1 to 610_n is used to synchronize the input signal with the binary signal.

The binary signal processing unit 620 outputs a selection signal mixed with the input binary signal. To this end, the binary signal processing unit 620 includes j number of delay units 621_1 to 621_j and a selection signal generation unit 622. Accordingly, the selection signal generation unit 622 can generate $2^{j+1}$ selection signals using the j number of delay units 621_1 to 621_j. For example, when the binary signal processing unit 620 includes two delay units, the selection signal generation unit 622 can generate $2^3$ selection signals (i.e., 000, 001, 010, 011, 100, 101, 110, and 111).

The selection unit 630 selectively transmits the signal output from the input signal processing unit 610 according to the selection signal output from the binary signal processing unit 620. For example, if the binary signal processing unit 620 outputs 000 as the selection signal, the selection unit 630 outputs a level 0 for the signal output from the input signal processing unit 610. If the binary signal processing unit 620 outputs 111 as the selection signal, the selection unit 630 outputs a level m for the signal output from the input signal processing unit 610. Here, the level m is a level 7.

As such, the input signal separation unit 600 outputs one of levels 0 to m for the input signal corresponding to the binary signal. At this time, the level output from the input signal separation unit 600 may be regarded as an estimate of an ideal signal. The output level is transmitted to the level value detection block 640.

The level value detection block 640 calculates an average value for each of the levels 0 to m and determines the calculated average value as the level value of the input signal. To this end, the level value detection block 640 includes (m+1) average filters 640_0 to 640_m. Thus, the level value detection block 640 may be defined as a filter unit. The average filters 640_0 to 640_m can calculate an average value for each input level. For example, the average filters 640_0 to 640_m can calculate an average value for each level according to Equation 1:

Updated level value=Previous level value+(Delayed input signal-Previous level value)/Constant, where the updated level value is an average value calculated by each of the average filters 640_0 to 640_m, the previous level value can be maintained by each of the average filters 640_0 to 640_m, and the delayed input signal is a level output from the input signal separation unit 600.

In Equation 1, the constant can be experimentally determined based on the reproduction speed of the data reproduction apparatus 100. As the constant increases, the updated level value decreases and the reproduction speed of the data reproduction apparatus 100 also decreases. The constant may be set to, for example, 256. In the calculation of an average value using Equation 1, if the delayed input signal is the same as the previous level value, the updated level value is the same as the previous level value. The average filters 640_0 to 640_m may also be configured to calculate an average value using low-pass filters.

The viterbi decoder 140 sets an initial level based on the plurality of level values provided by the level value determination unit 130, and performs viterbi-decoding on the first input signal.

Figure 7:
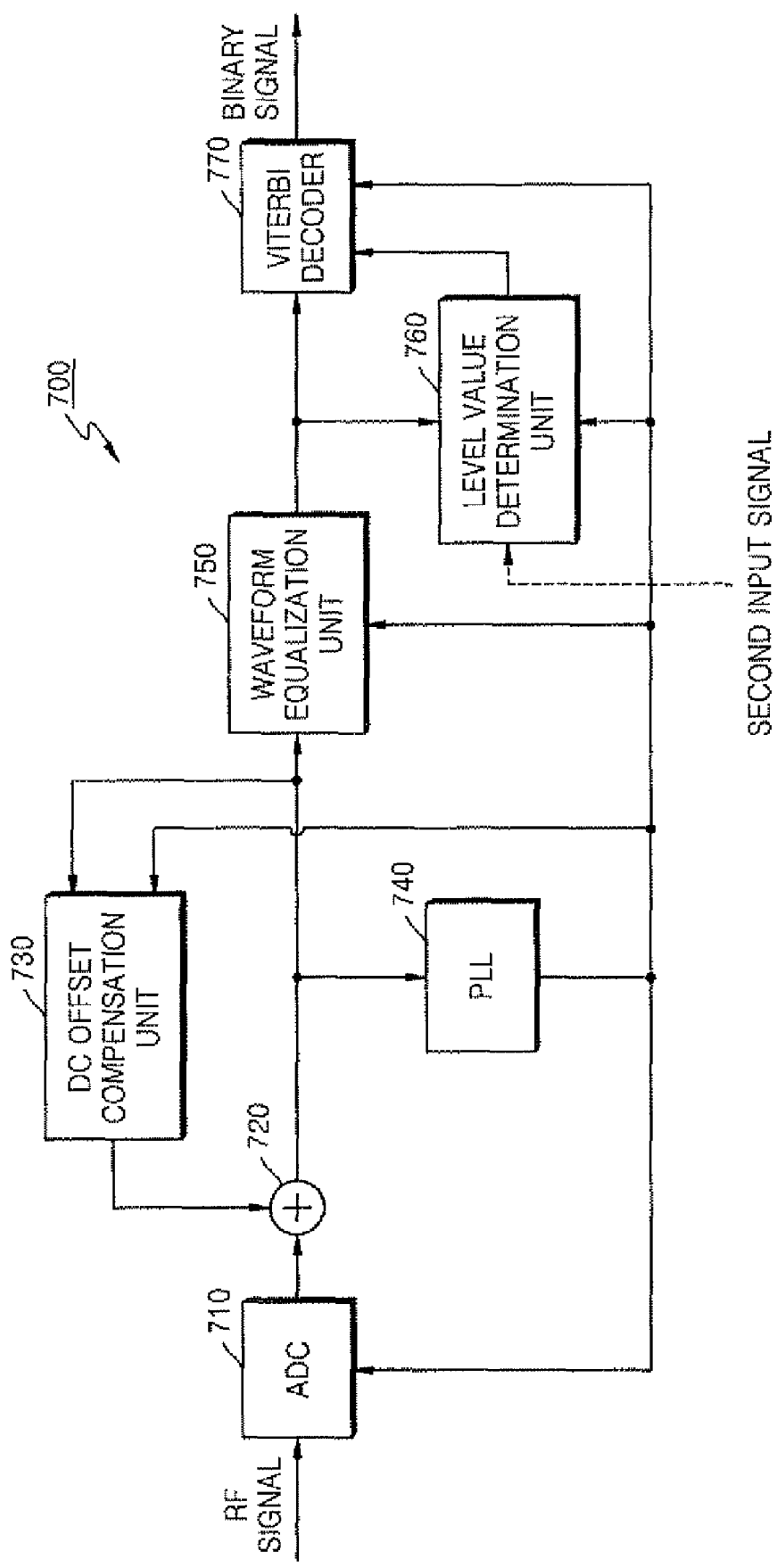
FIG. 7 is a block diagram illustrating an application example of a data reproduction apparatus.

FIG. 7 is a block diagram of an application example of the data reproduction apparatus 100 in which an optical disc driver 700 is illustrated. Referring to FIG. 7, the optical disc driver 700 includes an analog-to-digital converter (ADC) 710, an adder 720, a direct current (DC) offset compensation unit 730, a phase locked loop (PLL) 740, a waveform equalization unit 750, a level value determination unit 760, and a viterbi decoder 770.

The ADC 710 samples an input RF signal. The input RF signal is a signal reproduced from a disc (not shown). The adder 720 and the DC offset compensation unit 730 compensate for a DC offset component included in the sampled RF signal. Then, the RF signal is transmitted to the waveform equalization unit 750. The waveform equalization unit 750 makes the channel characteristic of the input RF signal optimal. The signal output from the waveform equalization unit 750 is the first input signal as described above with reference to FIG. 1 (i.e., sampled digital data or a quantized binary signal of the RF signal).

The level value determination unit 760 includes the storage unit 110, the frequency detection unit 120, and the level value determination unit 130 illustrated in FIG. 1 in order to determine a level value for the signal output from the waveform equalization unit 750. When the first input signal and the second input signal are different signals, the first input signal of the level value determination unit 760 may be input from the waveform equalization unit 750 and the second input signal may be input through another input terminal as indicated by a dotted line. A plurality of level values are output from the level value determination unit 760.

The viterbi decoder 770 sets the initial level value based on the plurality of level values output from the level value determination unit 760. Then, the viterbi decoder 770 viterbi-decodes the input signal transmitted from the waveform equalization unit 750, thereby outputting a binary signal. At this time, the PLL 740 generates a system clock for the optical disc driver 700 and provides the generated system clock to components of the optical disc driver 700. However, as mentioned above, even when the system clock generated by the PLL 740 is not in a stable state, the level value determination unit 760 determines a level value for the signal output from the waveform equalization unit 750 and outputs the determined level value to the viterbi decoder 770. Thus, the viterbi decoder 770 outputs a binary signal that is appropriate for the channel characteristic.

Figure 8:
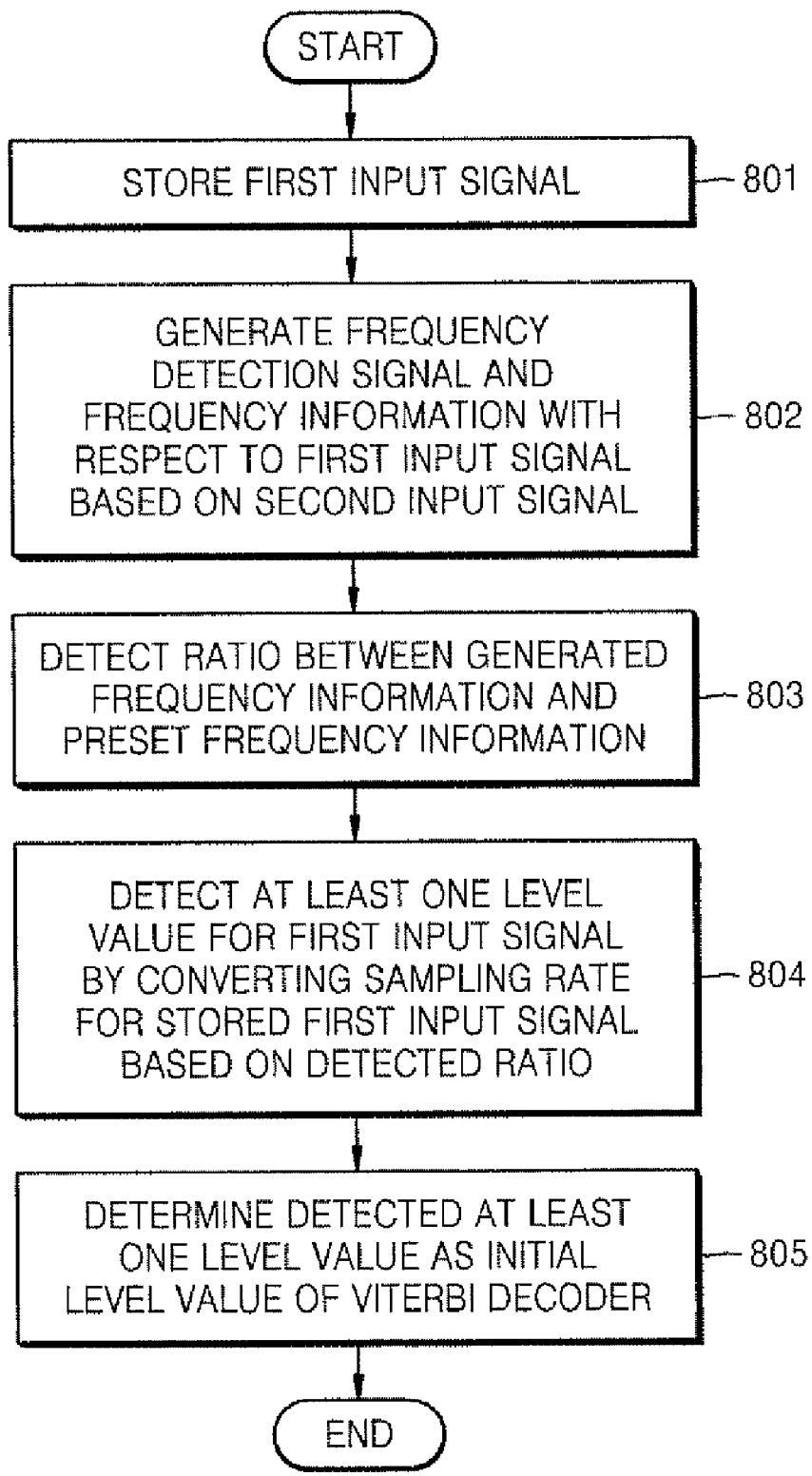
FIG. 8 is a flowchart illustrating an example of a data reproduction method.

FIG. 8 is a flowchart illustrating an example of a data reproduction method. Referring to FIG. 8, a first input signal (as shown in FIG. 1) is stored in operation 801. The first input signal may be a sampled digital signal or a quantized binary signal of a reproduced signal. Next, the frequency of the first input signal is detected (or determined) based on a second input signal (as shown in FIG. 1). A frequency detection signal indicating that the frequency is detected (or determined) and frequency information of the detected frequency are generated in operation 802. The frequency detection signal and the frequency information may be generated in the same manner as described above with reference to the frequency detection unit 120 illustrated in FIG. 1.

Figure 9:
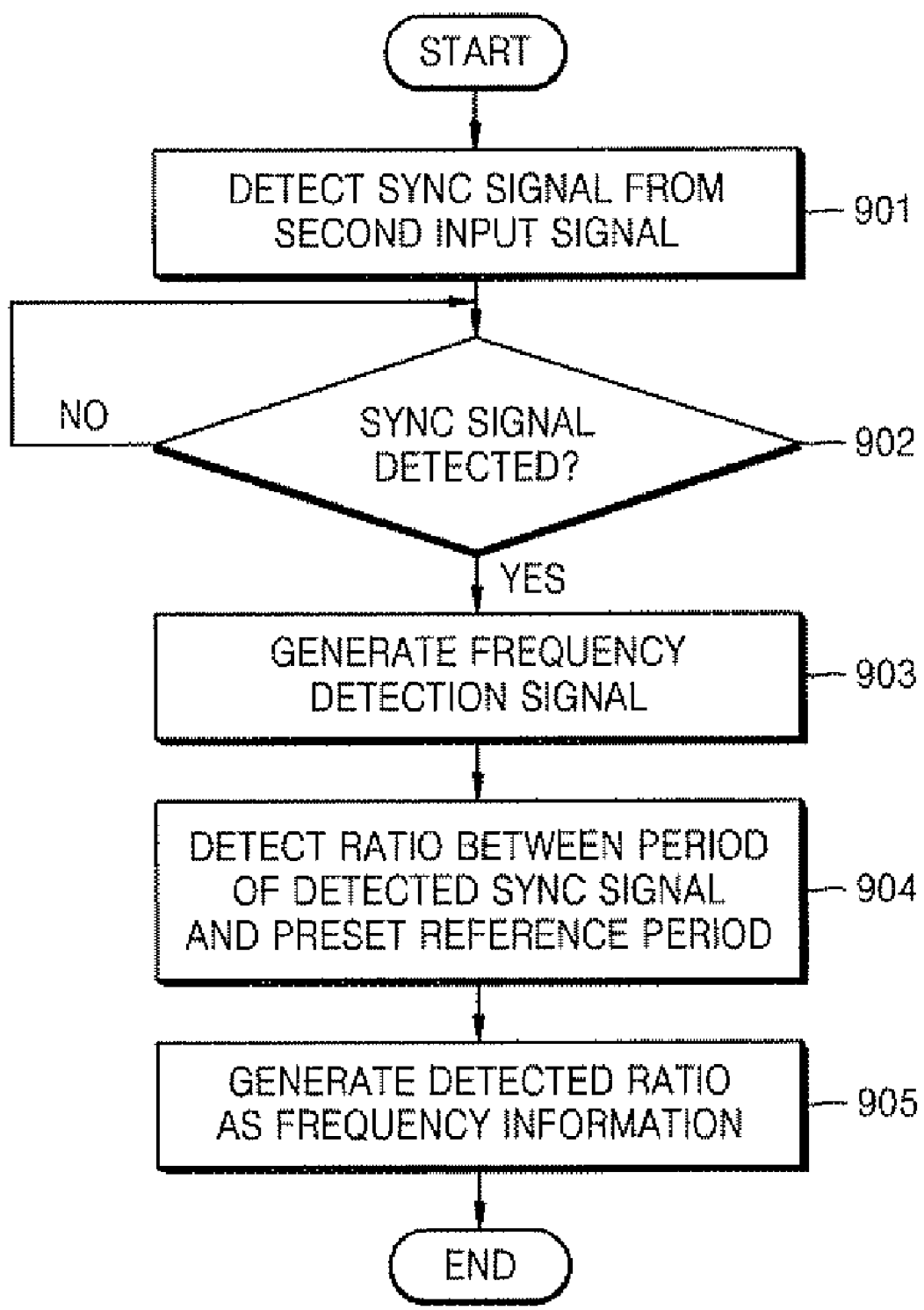
FIG. 9 is a flowchart illustrating an example of a method of generating a frequency detection signal and frequency information.

When the first input signal and the second input signal are a same signal, the frequency detection signal and the frequency information can be generated as illustrated in FIG. 9. FIG. 9 is a flowchart illustrating an example of a method of generating the frequency detection signal and the frequency information.

In operation 901, a sync signal is detected form the second input signal. The sync signal is detected as described above with reference to the sync signal detection unit 201 illustrated in FIG. 2. If it is determined that the sync signal is detected in operation 902, the frequency detection signal is generated in operation 903. Next, a ratio between a period of the detected sync signal and a preset reference period is determined in operation 904. The ratio may be determined as described above with reference to the frequency information generation unit 203 illustrated in FIG. 2. Then, the detected ratio is generated as the frequency information in operation 905. In operations 901 and 902, the sync signal may be defined as a maximum-period signal.

Figure 10:
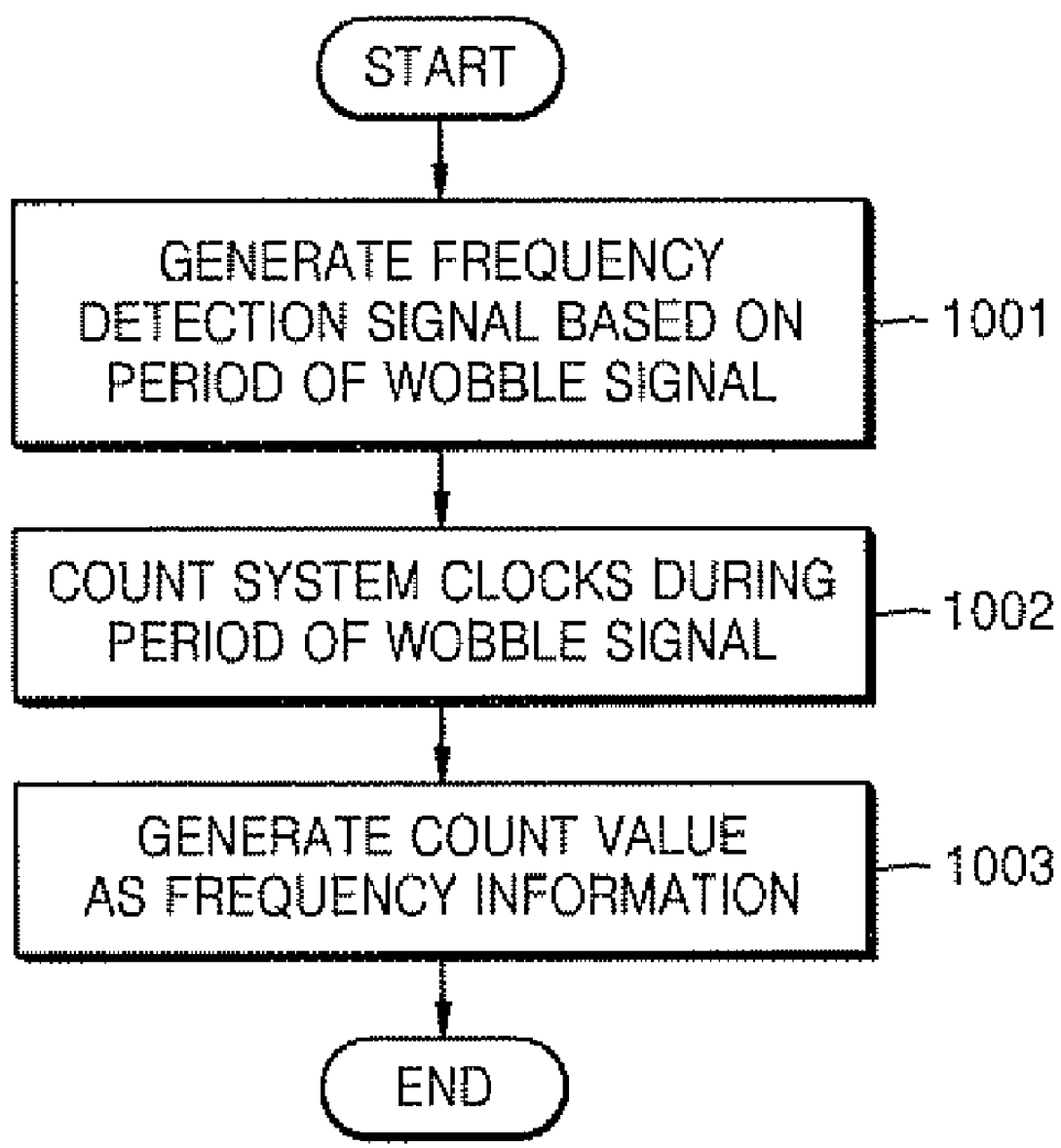
FIG. 10 is a flowchart illustrating another example of a method of generating a frequency detection signal and frequency information.

When the first input signal and the second input signal are different signals, the frequency detection signal and the frequency information can be generated as illustrated in FIG. 10. FIG. 10 is a flowchart illustrating another example of a method of generating the frequency detection signal and the frequency information.

When the first input signal is sampled digital data or a quantized binary signal of a signal reproduced from a recording medium such as a disc (not shown) and the second input signal is a wobble signal reproduced from the disc, the frequency detection signal is generated based on the period of the wobble signal in operation 1001. At this time, the frequency detection signal may be generated as described above with reference to the frequency detection signal generation unit 310 illustrated in FIG. 3.

Next, system clocks generated during the period of the wobble signal are counted in operation 1002. At this time, the system clocks may be or may not be in a stable state. Then, a count value of the system clocks is generated as the frequency information in operation 1003.

Referring back to FIG. 8, once the frequency detection signal and the frequency information are generated, a ratio between the generated frequency information and the preset frequency information is determined in operation 803. The preset frequency information is information about a stable operating frequency of the data reproduction apparatus 100 as described above with reference to FIG. 1. Upon determination of the ratio between the generated frequency information and the preset frequency information, at least one level value is detected for the first input signal by converting the sampling rate for the first input signal stored in operation 801 based on the detected ratio in operation 804. The detection of the at least one level value may be performed as illustrated in FIG. 11.

FIG. 11 is a detailed flowchart illustrating an example of a process of detecting at least one level value for the first input signal. Referring to FIG. 11, the ratio between the generated frequency information and the preset frequency information is calculated in operation 1101. Next, the sampling rate for the first input signal stored in operation 801 is converted based on the calculated ratio in operation 1102. The at least one level value is detected using the sampling-rate converted signal and a binary signal corresponding thereto in operation 1103. Operation 1103 may be performed as described above with reference to the level value detection unit 503 illustrated in FIG. 6.

In operation 805, the at least one level value detected in operation 804 is determined as the initial level value of the viterbi decoder 140 illustrated in FIG. 1.

General aspects can also be embodied as computer-readable code on a computer-readable recording medium. The computer-readable recording medium is any data storage device that can store data that can be thereafter read by a computer system. Examples of computer-readable recording media include read-only memory (ROM), random-access memory (RAM), CD-ROMs, magnetic tapes, floppy discs, and optical data storage devices. The computer-readable recording medium can also be distributed over a network of coupled computer systems so that the computer-readable code is stored and executed in a decentralized fashion. General aspects may also be realized as a data signal embodied in a carrier wave and comprising a program readable by a computer and transmittable over the internet.

As described above, according to general aspects, a ratio between frequency information of an input signal and operating frequency information of a data reproduction apparatus is calculated regardless of whether the operating frequency of the data reproduction apparatus is in a stable state. Furthermore, according to general aspects, a level value for the input signal is detected using a signal obtained by converting a sampling rate for the input signal based on the calculated ratio and a binary signal corresponding to the signal, and the detected level value is determined as an initial level value of a viterbi decoder. Accordingly, a binary signal that is adaptive to various channel characteristics irrespective of stabilization of the operating frequency is obtained during data reproduction using the viterbi decoder.

Although a few examples have been shown and described, it would be appreciated by those skilled in the art that changes may be made without limiting the scope of the examples, which is defined in the following claims.

What is claimed is:

1. A data reproduction apparatus having a viterbi decoder, the data reproduction apparatus comprising:
    a storage unit configured to store a first input signal;
    a frequency detection unit configured to:
        receive a second input signal;
        detect a frequency of the stored first input signal from the received second input signal;
        generate a frequency detection signal indicating that the frequency of the stored first input signal is detected; and
        generate frequency information of the stored first input signal based on the received second input signal; and
    a level value determination unit configured to:
        detect a ratio between the generated frequency information and preset frequency information according to the generated frequency detection signal;
        convert a sampling rate for the stored first input signal based on the detected ratio;
        detect at least one level value for the stored first input signal using the sampling-rate converted first input signal; and
        determine the detected at least one level value as an initial level value of the viterbi decoder.

2. The data reproduction apparatus as claimed in claim 1, wherein the first input signal is sampled digital data or a quantized binary signal of a reproduced signal.

3. The data reproduction apparatus as claimed in claim 1, wherein, when the first input signal and the second input signal are a same signal, the frequency detection unit is configured to generate the frequency detection signal and the frequency information based on a sync signal of the first input signal.

4. The data reproduction apparatus as claimed in claim 1, wherein, when the first input signal and the second input signal are a same signal, the frequency detection unit is configured to generate the frequency detection signal and the frequency information based on a maximum-period signal included in the first input signal.

5. The data reproduction apparatus as claimed in claim 1, wherein, when the first input signal and the second input signal are a same signal, the frequency detection unit comprises:
    a sync signal detection unit configured to detect a sync signal from the received second input signal;
    a frequency detection signal generation unit configured to generate the frequency detection signal if the sync signal is detected by the sync signal detection unit; and
    a frequency information generation unit configured to generate the frequency information as a ratio between a period of the sync signal detected by the sync signal detection unit and a preset reference period.

6. The data reproduction apparatus as claimed in claim 1, wherein, when the first input signal is a signal reproduced from a disc and the second input signal is a wobble signal reproduced from the disc, the frequency detection unit comprises:
    a frequency detection signal generation unit configured to generate the frequency detection signal based on a period of the wobble signal; and
    a frequency information generation unit configured to generate the frequency information as a count value of system clocks generated by the data reproduction apparatus during the period of the wobble signal.

7. The data reproduction apparatus as claimed in claim 1, wherein the level value determination unit comprises:
    a sampling rate conversion unit configured to convert the sampling rate for the first input signal stored in the storage unit based on the detected ratio;
    a binary signal generation unit configured to generate a binary signal corresponding to the sampling-rate converted first input signal; and
    a level value detection unit configured to detect the at least one level value using the sampling-rate converted first input signal and the generated binary signal.

8. The data reproduction apparatus as claimed in claim 7, wherein the level value detection unit comprises:
    an input signal separation unit configured to separate the sampling-rate converted first input signal into a plurality of levels using the generated binary signal; and
    a level value detection block configured to calculate an average value for each of the levels.

9. A data reproduction method using a viterbi decoder, the data reproduction method comprising:
   storing a first input signal;
   receiving a second input signal;
   detecting a frequency of the stored first input signal from the received second input signal;
   generating a frequency detection signal indicating that the frequency of the first input signal is detected;
   generating frequency information of the stored first input signal based on the received second input signal;
   detecting a ratio between the generated frequency information and preset frequency information according to the generated frequency detection signal;
   detecting at least one level value for the stored first input signal, the detecting of the at least one level value comprising converting a sampling rate for the stored first input signal based on the detected ratio; and
   determining the detected at least one level value as an initial level value of the viterbi decoder.

10. The data reproduction method as claimed in claim 9, wherein the first input signal is sampled digital data or a quantized binary signal of a reproduced signal.

11. The data reproduction method as claimed in claim 9, wherein, when the first input signal and the second input signal are a same signal, the generating of the frequency detection signal and the frequency information comprises generating the frequency detection signal and the frequency information based on a sync signal of the first input signal.

12. The data reproduction method as claimed in claim 9, wherein, when the first input signal and the second input signal are a same signal, the generating of the frequency detection signal and the frequency information comprises generating the frequency detection signal and the frequency information based on a maximum-period signal included in the first input signal.

13. The data reproduction method as claimed in claim 9, wherein, when the first input signal and the second input signal are a same signal, the generating of the frequency detection signal and the frequency information comprises:
   detecting a sync signal from the received second input signal;
   generating the frequency detection signal if the sync signal is detected; and
   generating the frequency information as a ratio between a period of the detected sync signal and a preset reference period.

14. The data reproduction method as claimed in claim 9, wherein, when the first input signal is a signal reproduced from a disc and the second input signal is a wobble signal reproduced from the disc, the generating of the frequency detection signal and the frequency information comprises:
   generating the frequency detection signal based on a period of the wobble signal; and
   generating the frequency information as a count value of system clocks generated during the period of the wobble signal.

15. The data reproduction method as claimed in claim 9, wherein the detecting of the at least one level value for the first input signal further comprises:
   generating a binary signal corresponding to the sampling-rate converted first input signal; and
   detecting the at least one level value using the sampling-rate converted first input signal and the generated binary signal.

16. The data reproduction method as claimed in claim 15, wherein the detecting of the at least one level value using the sampling-rate converted first input signal and the generated binary signal comprises:
   separating the sampling-rate converted first input signal into a plurality of levels using the generated binary signal; and
   calculating an average value for each of the levels.

17. A computer-readable recording medium encoded with the method of claim 9 and implemented by a computer.

18. A data reproduction apparatus having a viterbi decoder, the data reproduction apparatus comprising:
   a frequency detection unit configured to:
      receive a second input signal; and
      generate frequency information of a first input signal based on the received second input signal; and
   a level value determination unit configured to:
      detect a ratio between the generated frequency information and preset frequency information;
      convert a sampling rate for the stored first input signal based on the detected ratio;
      detect at least one level value for the stored first input signal using the sampling-rate converted first input signal; and
      determine the detected at least one level value as an initial level value of the viterbi decoder.

19. The data reproduction apparatus as claimed in claim 18, further comprising:
   a storage unit to store the first input signal.

20. The data reproduction apparatus as claimed in claim 18, wherein the frequency detection unit is further configured to:
   detect a frequency of the first input signal from the received second input signal; and
   generate a frequency detection signal indicating that the frequency of the first input signal is detected.

21. The data reproduction apparatus as claimed in claim 18, wherein, when the first input signal and the second input signal are a same signal, the frequency detection unit is further configured to generate the frequency information based on a sync signal of the first input signal.

22. The data reproduction apparatus as claimed in claim 18, wherein, when the first input signal and the second input signal are a same signal, the frequency detection unit is further configured to generate the frequency information based on a maximum-period signal included in the first input signal.

23. The data reproduction apparatus as claimed in claim 18, wherein, when the first input signal and the second input signal are a same signal, the frequency detection unit comprises:
   a sync signal detection unit configured to detect a sync signal from the received second input signal; and
   a frequency information generation unit configured to generate the frequency information as a ratio between a period of the sync signal detected by the sync signal detection unit and a preset reference period.

24. The data reproduction apparatus as claimed in claim 18, wherein, when the first input signal is a signal reproduced from a disc and the second input signal is a wobble signal reproduced from the disc, the frequency detection unit comprises:
   a frequency information generation unit configured to generate the frequency information as a count value of system clocks generated by the data reproduction apparatus during a period of the wobble signal.

25. The data reproduction apparatus as claimed in claim 19, wherein the level value determination unit comprises:

a sampling rate conversion unit configured to convert the sampling rate for the first input signal based on the ratio between the generated frequency information and the preset frequency information;

a binary signal generation unit configured to generate a binary signal corresponding to the sampling-rate converted first input signal; and a level value detection unit configured to detect the at least one level value using the sampling-rate converted first signal and the binary signal.

26. A data reproduction method using a viterbi decoder, the data reproduction method comprising:

receiving a second input signal;

generating frequency information of a first input signal based on the received second input signal;

detecting a ratio between the generated frequency information and preset frequency information;

detecting at least one level value for the first input signal, the detecting of the at least one level value comprising converting a sampling rate for the first input signal based on the detected ratio; and determining the detected at least one level value as an initial level value of the viterbi decoder.

27. The data reproduction method as claimed in claim 26, further comprising:

storing the first input signal.

28. The data reproduction method as claimed in claim 26, further comprising:

detecting a frequency of the first input signal from received second input signal; and generating a frequency detection signal indicating that the frequency of the first input signal is detected.

29. The data reproduction method as claimed in claim 26, wherein, when the first input signal and the second input signal are a same signal, the generating of the frequency information comprises generating the frequency information based on a sync signal of the first input signal.

30. The data reproduction method as claimed in claim 26, wherein, when the first input signal and the second input signal are a same signal, the generating of the frequency information comprises generating the frequency information based on a maximum-period signal included in the first input signal.

31. The data reproduction method as claimed in claim 26, wherein, when the first input signal and the second input signal are a same signal, the generating of the frequency information comprises:

detecting a sync signal from the received second input signal; and generating the frequency information as a ratio between a period of the detected sync signal and a preset reference period.

32. The data reproduction method as claimed in claim 26, wherein, when the first input signal is a signal reproduced from a disc and the second input signal is a wobble signal reproduced from the disc, the generating of the frequency information comprises:

generating the frequency information as a count value of system clocks generated during a period of the wobble signal.

33. The data reproduction method as claimed in claim 26, wherein the detecting of the at least one level value for the first input signal comprises:

generating a binary signal corresponding to the sampling-rate converted first input signal; and detecting the at least one level value using the sampling-rate converted first input signal and the generated binary signal.

34. A computer-readable recording medium encoded with the method of claim 26 and implemented by a computer.

* * * * *